United States Patent [19]

Yamaguchi et al.

[11] Patent Number: 5,343,136
[45] Date of Patent: Aug. 30, 1994

[54] CHARGER FOR CHARGING A RECHARGEABLE BATTERY

[75] Inventors: Shuji Yamaguchi, Tokyo; Koichi Ito, Hino, both of Japan

[73] Assignee: Kabushiki Kaisha Toshiba, Kawasaki, Japan

[21] Appl. No.: 696,275

[22] Filed: May 2, 1991

Related U.S. Application Data

[62] Division of Ser. No. 472,123, Jan. 30, 1990, abandoned.

[30] Foreign Application Priority Data

Jan. 31, 1989 [JP] Japan .................. 1-21195

[51] Int. Cl.5 .................. H02J 7/00; H01M 10/46; H04M 1/02
[52] U.S. Cl. .................. 320/2; 320/3; 320/56; 307/151; 379/61
[58] Field of Search .................. 320/2, 3, 56; 455/89; 379/61, 63; 307/151

[56] References Cited

U.S. PATENT DOCUMENTS

| | | | |
|---|---|---|---|
| 2,978,596 | 4/1961 | Robirds | 307/151 |
| 3,270,267 | 8/1966 | Nolte, Jr. | 320/56 |
| 3,629,680 | 12/1971 | Baynes et al. | 320/2 |
| 3,735,232 | 5/1973 | Fister | 320/2 |
| 3,749,905 | 7/1973 | Friedman et al. | 320/3 X |
| 3,947,743 | 3/1976 | Mabuchi et al. | 320/3 |
| 4,092,580 | 5/1978 | Prinsze | 320/2 |
| 4,311,952 | 1/1982 | Mabuchi et al. | 320/3 |
| 4,563,626 | 1/1986 | Ohtake | 320/2 |
| 4,636,741 | 1/1987 | Mitzlaff | 455/89 X |
| 4,647,722 | 3/1987 | Nichida et al. | 379/63 |
| 4,670,700 | 6/1987 | Henkel | 320/2 |
| 4,684,870 | 8/1987 | George et al. | 320/2 |
| 4,939,770 | 7/1990 | Makino | 379/61 |

FOREIGN PATENT DOCUMENTS 0087055  4/1988  Japan .................. 379/61

Primary Examiner—R. J. Hickey
Attorney, Agent, or Firm—Finnegan, Henderson, Farabow, Garrett & Dunner

[57] ABSTRACT

A cordless telephone system in which a battery of a mobile unit can be charged with use of a cordless charger. The charger, which is provided separately from a base unit, has a chargeable battery which is larger in current capacity than the battery within the mobile unit. When the mobile unit is mounted on the charger, the battery of the mobile unit is charged with the battery of the charger. So long as the charge level of the battery within the charger is sufficiently high, the battery of the mobile unit is charged with the battery of the charger and without use of a commercial AC power source.

4 Claims, 5 Drawing Sheets

CHARGER FOR CHARGING A RECHARGEABLE BATTERY

This application is a division of application Ser. No. 07/472,123, filed Jan. 30, 1990, now abandoned.

BACKGROUND OF THE INVENTION

1. Field of the Invention

The present invention relates to a cordless telephone system in which a battery of a mobile unit is chargeable from a cordless charger.

2. Description of the Prior Art

There has been so far known a cordless telephone system of multi-channel type which comprises a base unit connected to a wired line (public line) and a mobile unit coupled with the base unit through a spatial communication circuit and which controls call transmission and reception between the base and mobile units on a control channel and then detects idle one of a plurality of speech channels to realize a speech.

In such a cordless telephone system, in order that the mobile unit can talk with the party at an arbitrary position away from the base unit, the mobile unit incorporates a chargeable battery therein as its operational power source and the battery is designed to be charged through a charging mechanism of the base unit when the mobile unit itself is mounted on the base unit.

Referring to FIG. 9, there is schematically shown an arrangement of such a prior art cordless telephone system as stated above, which comprises a base unit 1 connected to wired lines (public line) 2 and a mobile unit 3 coupled with the base unit 1 through a spatial communication circuit 4. Connected to the base unit 1 is a power source adapter 6 which converts an AC voltage of a commercial AC power source 5 into a DC voltage. When the mobile unit 3 is mounted on the base unit 1, the base unit 1 supplies an output voltage from the power source adapter 6 to the mobile unit 3 to charge a battery housed within the mobile unit 3.

The aforementioned arrangement, however, imposes such a use restriction that the base unit 1 must be connected with the wired lines 2 and also be installed at such a specific location that can be connected with the commercial AC power source 5. For this reason, such an arrangement that the battery of the mobile unit 3 must be charged from the power source adapter 6 of the base unit 1, is inconvenient in handling.

To overcome such an inconvenience, there has been suggested a charge-only charger which is provided as a device separated from the base unit and which uses a commercial AC power source to charge the battery of the mobile unit 3.

However, the aforementioned charge-only charger, though it can be charged at a location different from the installation location of the base unit 1, must be positioned at a place close to a commercial AC power source, which results in that, in an outdoor field or such a place where it is difficult to have access to the commercial AC power source it becomes impossible to charge the charger. Thus, in the case where the battery of the mobile unit 3 is decreased down to its to-be-charged level beyond its normal charge level, it is disadvantageously required to carry the mobile unit 3 to a place where the charger is disposed close to the commercial AC power source.

SUMMARY OF THE INVENTION

It is an object of the present invention to provide a cordless telephone system which can eliminate the above disadvantage in the prior art and which can charge a battery incorporated within a mobile unit even in an outdoor field or the like place where it is hard to have access to a commercial AC power source.

In accordance with an aspect of a cordless telephone system of the present invention, a chargeable battery, which is larger in current capacity than a battery provided within a mobile unit, is provided within a charger provided as a device separated from a base unit so that, when the mobile unit is mounted on the base unit, this causes the battery of the mobile unit to be charged.

Since the current capacity of the battery of the charger is larger than that of the mobile unit, the battery of the charger can charge the battery of the mobile unit without the use of a commercial AC power source, so long as the charger battery maintains its normal charge level. Thus, even when the mobile unit is used for a long time in an outdoor field or the like place, the mobile unit can be, as necessary, charged with the charger carried there by the mobile unit user.

In this way, in the present invention, since the charger itself contains the battery, the user can charge and use the mobile unit as necessary during a power failure or in an outdoor field or the like place where it is difficult to have access to a commercial AC power source, whereby the mobile unit can be portably used in a wide area. In addition, the present invention has a merit that the battery of the mobile unit can be made small in capacity.

DESCRIPTION OF THE PREFERRED EMBODIMENTS

Figure 1A:
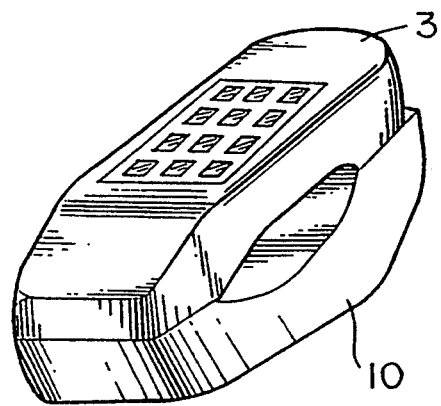
FIGS. 1(a) and 1(b) show perspective and side views of a mobile unit and a charger used in an embodiment of a cordless telephone system in accordance with the present invention, respectively.
Figure 1B:
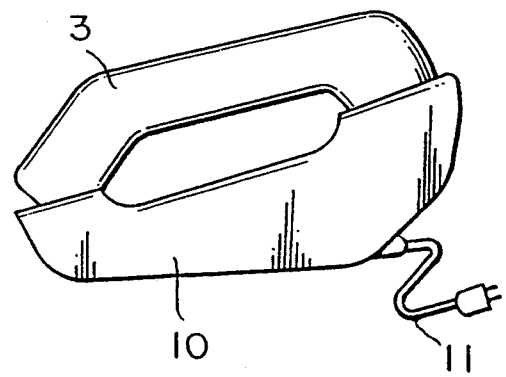

Referring first to FIG. 1(a) and (b), there are shown, in perspective and side views, a mobile unit 3 and a charger 10 which are used in an embodiment of a cordless telephone system of the present invention. In the present embodiment, the charger 10 is arranged to charge a battery provided within the mobile unit 3 when the mobile unit 3 is mounted on the charger 10.

More in detail, the charging of the battery of the mobile unit 3 is carried out by supplying an output from a battery provided within the charger 10 to the battery of the mobile unit 3. And when the battery of the charger 10 drops down to its to-be-charged level beyond its normal charge level, the charger battery must be charged on a commercial AC power source. To this end, the charger 10 is disconnectably connected with an AC power source cord 11.

Figure 2:
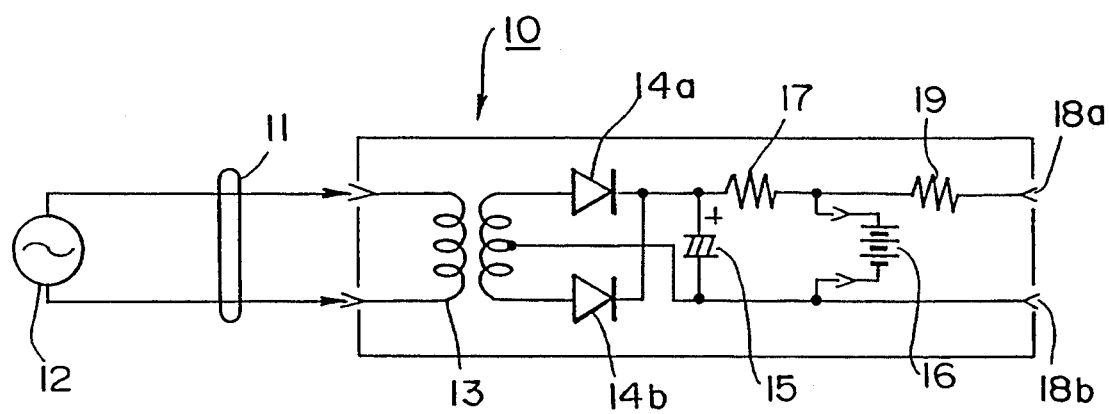
FIG. 2 is a circuit diagram of the charger in the embodiment.

The charger 10, as shown by a circuit diagram in FIG. 2, includes a step-down transformer 13 for converting a voltage of a commercial AC power source 12 received through the AC power source cord 11 into a lower AC voltage, diodes 14a and 14b for rectifying an output voltage appearing in a secondary winding of the transformer 13, a capacitor 15 for smoothing the rectified output voltage from the diodes, a battery 16 to be charged with the rectified and smoothed voltage, a current limiting resistor 17 for limiting a charging current to the battery 16, and another current limiting resistor 19 for limiting a current when an output voltage of the battery 16 is supplied from charging terminals 18a and 18b.

Figure 3:
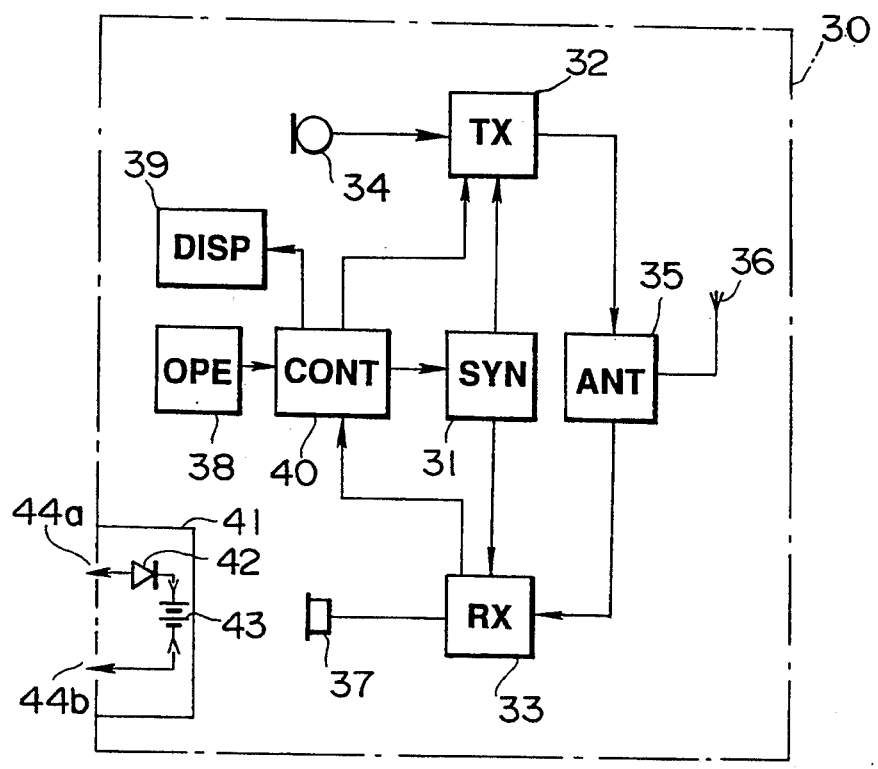
FIG. 3 is a block diagram showing an arrangement of the mobile unit in the embodiment.

On the other hand, the mobile unit 30, as shown in FIG. 3, includes a power supply circuit 41 which has a battery 43 to be charged with a DC voltage supplied from charging terminals 44a and 44b and has a diode 42 for prevention of reverse current.

In the present embodiment, the battery 16 within the charger 10 is set to be larger in current capacity than the battery 43 within the mobile unit 30, and when the mobile unit 30 is placed on the charger 10, this causes the charging terminals 18a and 18b to be automatically connected with the charging terminals 44a and 44b. Further, the charger 10 is provided with a latch mechanism which holds the mobile unit 30 placed on the charger 10 to allow the user to portably carry the charger 10 mounted with the mobile-unit 30 thereon.

Figure 4:
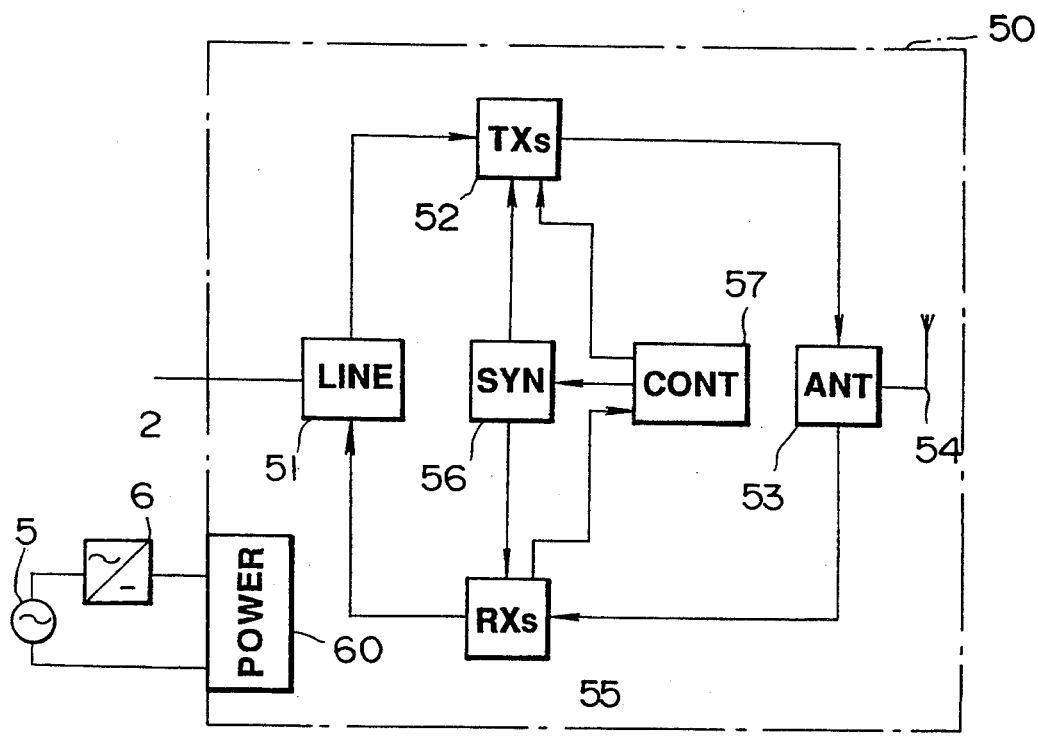
FIG. 4 is a block diagram showing an arrangement of a base unit used in the embodiment.

Shown in FIG. 4 is a base unit 50 which functions to communicate with the mobile unit 30 of FIG. 3.

In the mobile unit 30 of FIG. 3, a controller 40 designates any of a plurality of speech channels and control channels and informs a synthesizer 31 of the designated channel. The synthesizer 31 in turn, in response to it, applies a signal indicative of the designated channel to a transmitter 32 and a receiver 33 respectively. As a result, the transmitter 32 and the receiver 33 operate on the channel designated by the controller 31. More in detail, the transmitter 32 receives a voice signal from a transmitter of a handset and sends it to a multiplexer/distributor 35 to be transmitted from an antenna 36, while the receiver 33 receives a voice signal from the antenna 36 through the multiplexer/distributor 35 and sends it to a receiver 37 of the handset. The transmitter 32 also receives a control signal from the controller 40 and sends it to the multiplexer/distributor 35 to be transmitted from the antenna 36, while the receiver 33 receives a control signal from the antenna 36 through the multiplexer/distributor 35 and sends the control signal to the controller 40. The controller 40, in response to input operations from an operating part 38, generally controls the mobile unit 30 or causes various data to be indicated on a display 39.

The base unit 50 of FIG. 4 includes a wired-line interface 51 which is connected to a public line 2. A voice signal on the public line is sent through the wired-line interface 51 to a transmitter 52 as its modulation input. The transmitter 52 sends its modulation output to a multiplexer/distributor 53 to be transmitted from an antenna 54. A signal received at the antenna 54 is applied through the multiplexer/distributor 53 to a receiver 55 as its demodulation input. The receiver 55 supplies its demodulation output through the wired-line interface 51 onto the public line 2 as a voice signal. A controller 57 designates predetermined one of a plurality of speech channels and informs a synthesizer 56 of the designated speech channel. The synthesizer 56, when informed of the designated speech channel, sends a signal indicative of the designated speech channel to the transmitter 52 and the receiver 55 respectively. As a result, the transmitter 52 and the receiver 55 operate on the speech channel designated by the controller 57 for radio communication of the voice signal on the speech channel. The transmitter 52 also receives a control signal from the controller 57 and sends it to the multiplexer/distributor 53 to be transmitted from the antenna 54. The receiver 55 also receives a control signal from the multiplexer/distributor 53 through the antenna 54, demodulates the control signal into a demodulated output and applies the demodulated output to the control 57. The base unit 50 also includes a power supply circuit 60 which is charged with an output of a power source adapter 6. The adapter 6 functions to convert an AC voltage of a commercial power source 5 to a DC voltage.

With such an arrangement as mentioned above, when it is first desired to sufficiently charge the battery 16 of the charger 10 from the commercial AC power source 12, the user connects the AC power source cord 11 to the charger 10 to supply the voltage of the commercial power source 12 to the charger 10. The commercial voltage supplied to the charger 10 is rectified through the transformer 13 and the diodes 14a and 14b into a DC voltage, which is smoothed through the capacitor 15 and then applied to the battery 16, thus charging the battery 16. At this time, if the mobile unit 30 is placed on the charger 10, then an output voltage across the capacitor 15 is also applied to the battery 43 of the mobile unit 30 through the charging terminals 18a, 18b, 44a and 44b, whereby the battery 43 of the mobile unit 30 is also charged simultaneously with the battery 16 of the charger 10.

After the battery 16 of the charger 10 is sufficiently charged a predetermined time later, the user disconnects the AC power source cord 11 from the charger 10 and carries the charger 10 together with the mobile unit 30 as far as his desired location. In the location, since the battery 16 of the charger 10 is already sufficiently charged, the battery 43 of the mobile unit 30 is always charged so long as the mobile unit 30 is placed on the charger 10. As a result, even in a field where the commercial AC power source 12 is not available thereabout, it is possible to charge the battery 43 of the mobile unit 30 as necessary and thus the allowable portable range of the mobile unit 30 can be expanded.

In this connection, the battery 16 of the charger 10 may be arranged to be removed from the charger 10 and to be charged by another charger available in the market, as required. In this case, since a necessary number of extra batteries already charged by the charger available in the market can be previously prepared, even when the battery 16 mounted in the charger 10 wears out and becomes dead, the dead battery can be replaced with new one of the extra batteries, which leads to the fact that the usable time of the mobile unit 30 operable in a field or the like place can be further prolonged.

Figure 5:
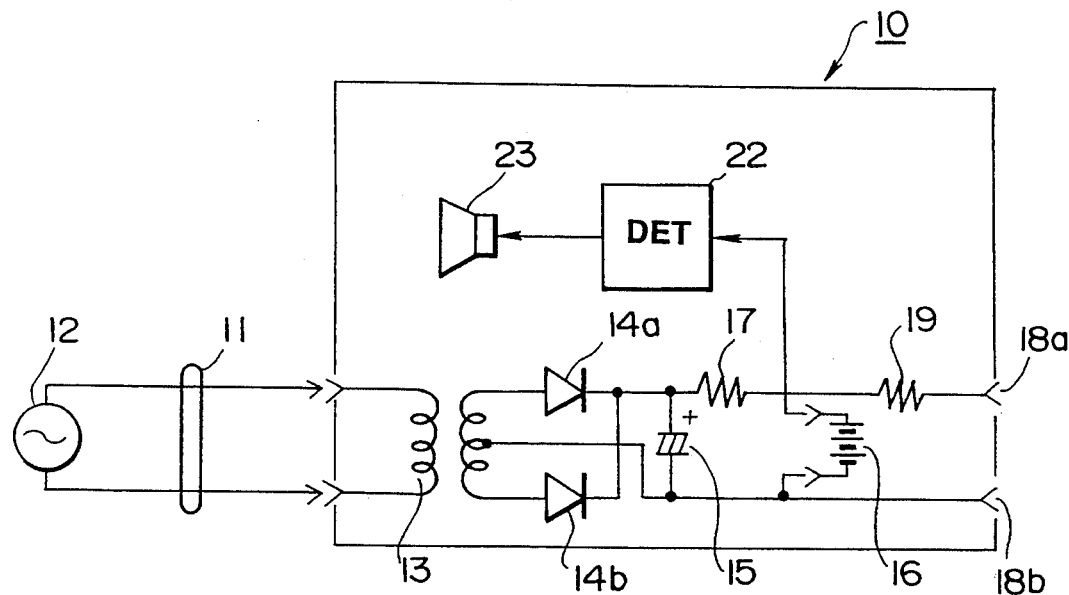
FIG. 5 is a circuit diagram of a charger used in another embodiment of the present invention.

There is shown in FIG. 5 another example of the charger 10 used in another embodiment of the present invention, in which a detecting circuit 22 for monitoring the voltage of the battery 16 is provided so that, when the voltage of the battery 16 drops to a level below its predetermined value, the detector 22 detects it as a charge request state and sends a detection output to a sounder 23 to cause the sounder 23 to generate an alarm tone. With this arrangement, the alarm tone can prompt the user to charge the battery 16 before the battery 16 reaches its insufficient charge level. The detecting circuit 22 is not limited to the specific example of the type which monitors the voltage of the battery 16 and may be of such a type that detects the wear-out or discharged level of the battery 16 based on another suitable method. For example, there may be employed such a detecting circuit that measures a period of time during which the the charger 10 is connected to the commercial AC power source 12, also measures a period of time during which the mobile unit 30 is connected to the charger 10, and determines the residual charged amount (charge level) level of the battery 16 on the basis of a difference between the measured time periods.

Figure 6:
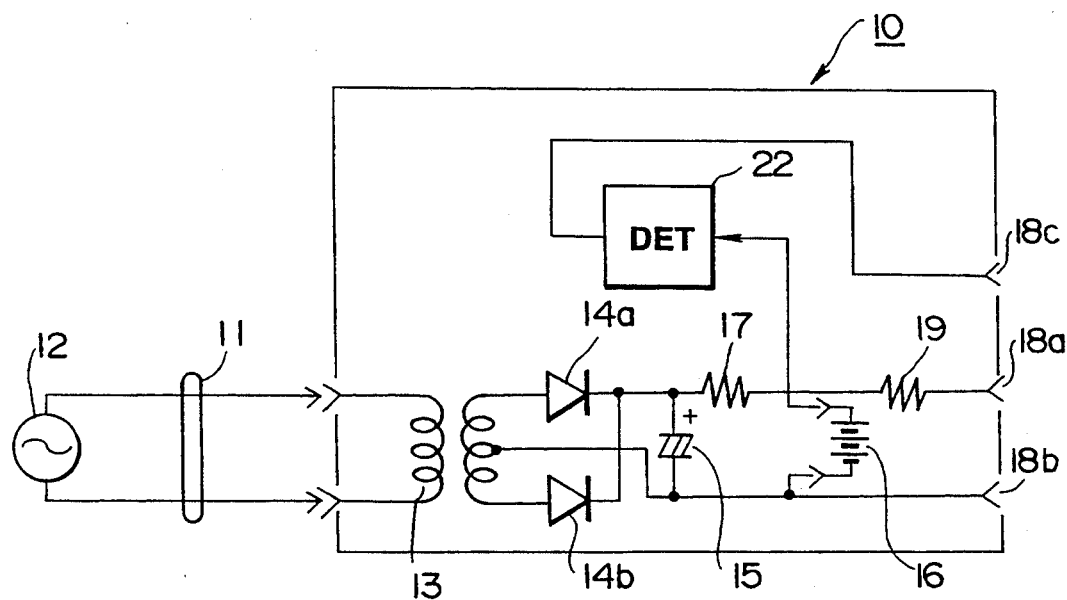
FIG. 6 is a circuit diagram of a charger used in a further embodiment of the present invention.
Figure 7:
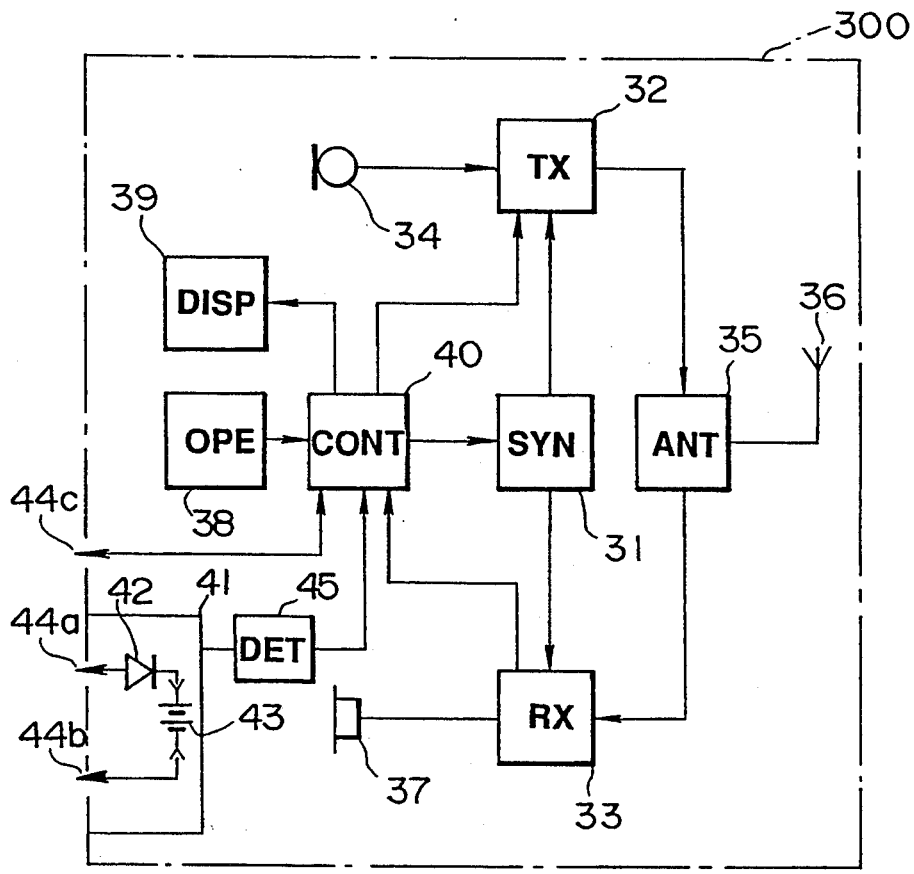
FIG. 7 is a block diagram showing an arrangement of a mobile unit used in the further embodiment.
Figure 9:
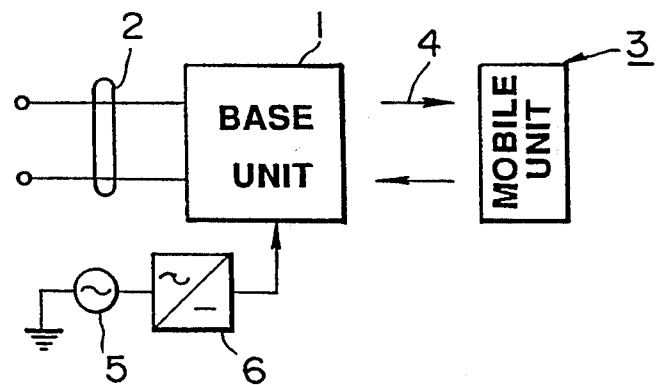
FIG. 9 is a schematic diagram showing an arrangement of a prior art cordless telephone system.

FIGS. 6 and 7 show a further example of the charger 10 and another example of the mobile unit 30 (that is, a mobile unit 300) both used in a further embodiment wherein the wear-out level of the battery 16 of the charger 10 is displayed on the display 39 in the mobile unit 300, respectively.

In th charger 10 of FIG. 6, the detecting circuit 22 for detecting the wear-out level of the battery 16 supplies its output to a terminal 18c.

Meanwhile, in the mobile unit 300 of FIG. 7, there are provided a terminal 44c which is connected to the terminal 18c when the mobile unit 300 is mounted on the charger 10 as well as a detecting circuit 45 which detects the wear-out level of the battery 43 of the power supply circuit 41. The terminal 44c is connected to the controller 40.

With such an arrangement, when the mobile unit 300 is placed on the charger 10, this causes the detector 22 for detection of the wear-out level of the battery 16 to send its output to the controller 40 through the terminals 18c and 44c. This causes the controller 22 to drive the display 39, thereby indicating the wear-out level of the battery 16 of the charger 10 on the display 39. When the detecting circuit 22 is of such a type that detects the charge level (or the residual charged amount) of the battery 16, the charge level (or the residual charged amount) of the battery 16 can be displayed on the display 39. Although the output of the detector 22 has been transmitted through the terminal 18c to the mobile unit 300 in the foregoing embodiment, the output of the detector 22 may be superimposed or multiplexed on the charging line and then transmitted through the terminals 18a and 18c to the mobile unit 300. In the latter case, the terminal 18c of the charger 10 and the terminal 44c of the mobile unit 300 can be eliminated.

Figure 8:
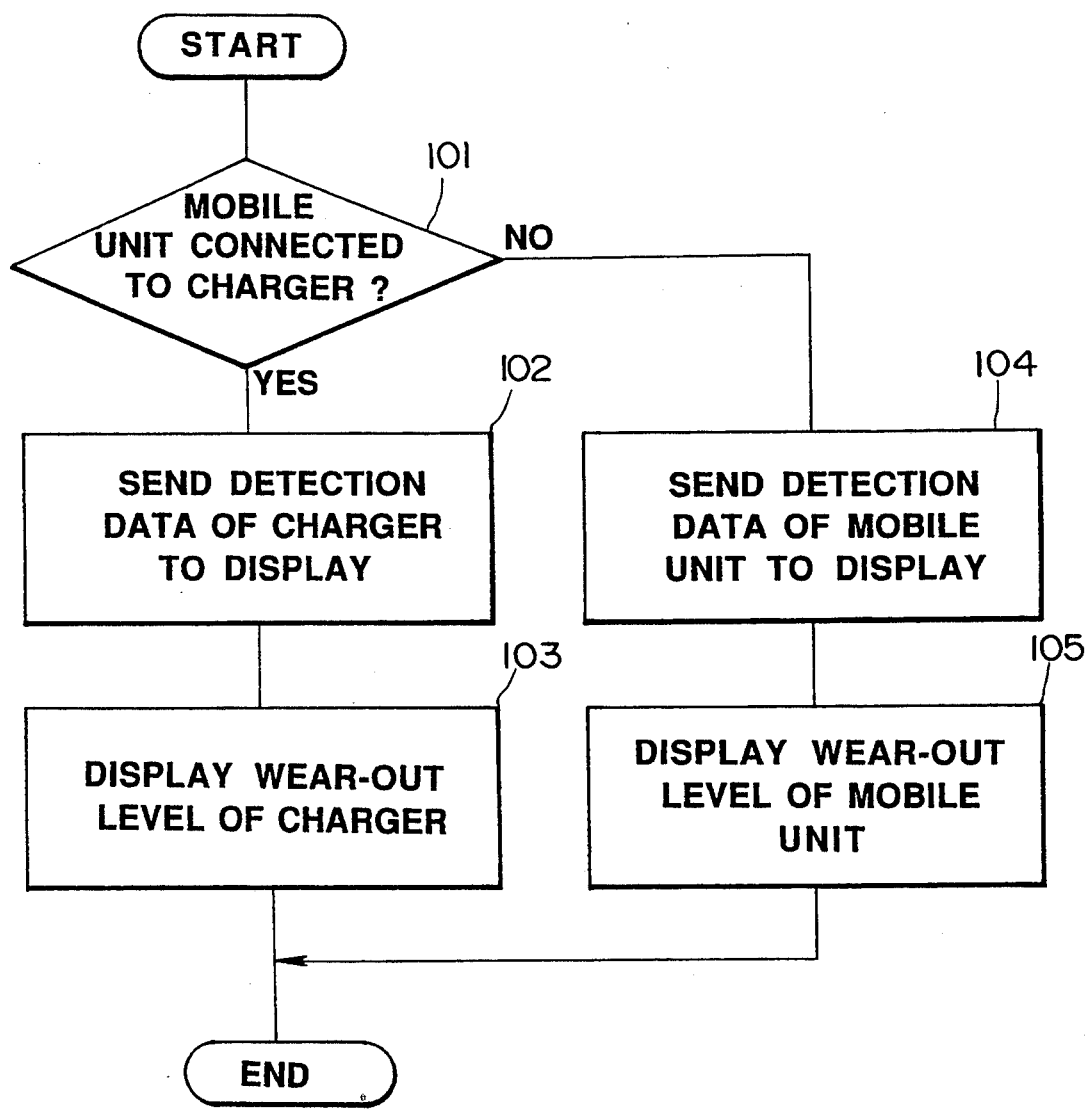
FIG. 8 is a flowchart for explaining the operation of the further embodiment.

FIG. 8 shows the operation of the controller 40 in the mobile unit 300. More in detail, when the mobile unit 300 is connected to the charger 10, the wear-out level of the battery 16 in the charger 10 is indicated on the display 39 of the mobile unit 300; whereas, when the mobile unit is dismounted from the charger 10, the wear-out level of the battery 43 in the power supply circuit 41 of the mobile unit 300 is indicated on the display 39 of the mobile unit 300. That is, when the mobile unit 30 is connected to the charger 10 (step 101), the controller 40 receives the output of the detector 22 in the charger 10 from the terminal 44c and sends it to the display 39 (step 102) to drive the display 39 and to display the wear-out level of the battery of the charger 10 on the display 39 (step 103). If the mobile unit 300 is not connected to the charger 10 (step 101), then the controller 40 sends the output of the detector 45 of the mobile unit 300 to the display 39 (step 104) to drive the display 39 and to indicate the wear-out level of the battery 43 of the mobile unit 300 on the display 39 (step 103). Even in this case, in the case where the detectors 22 and 45 are respectively of such a type that detects the charged amount (or the residual charge level) of the batteries 16 and 43, the charged amount (or the residual charge level) of the battery 16 or 43 can be displayed on the display 39.

Whether or not the mobile unit 300 is connected to the charger 10 may be determined on the basis of a signal sent from the terminal 44c. More in detail, when the controller 40 receives the signal from the terminal 44c, it judges that the mobile unit 300 is connected to the charger 10; while, when the controller 40 receives no signal from the terminal 44c, it judges that the mobile unit 300 is not connected to the charger 10.

In all the foregoing embodiments, explanation has been made as to the case where the charger 10 is provided separately from the mobile unit 30. However, the charger 10 may be arranged integrally with the mobile unit 30 so that the charger 10 can be removably attached to the bottom part of the mobile unit 30.

What is claimed is:
1. An electronic apparatus, comprising:
a mobile electronic device having a first rechargeable battery;
a charger detachable from and connectable to said mobile electronic device for charging said first rechargeable battery of the charger, said charger including:
   a plug connectable to an alternating current power source,
   means coupled to the plug for converting alternating current power to direct current power,
   a second rechargeable battery coupled to said converting means for holding said direct current power therein, and
   output terminal means coupled to said converting means and said second rechargeable battery for providing said direct current power to charge the first rechargeable battery of the mobile electronic device;
diode means in said mobile electronic device and coupled between said first and second rechargeable batteries for preventing a reverse current from the first rechargeable battery to the second rechargeable battery when the mobile electronic device is connected to the output terminal means of the charger,
wherein said converting means charges both the first rechargeable battery of the mobile electronic device and the second rechargeable battery of the charger during the time when the plug of the charger is connected to the alternating current power source and the mobile electronic device is connected to the output terminal means of the charger, and wherein the second rechargeable battery of the charger charges the first rechargeable battery of the mobile electronic device during the time when the plug of the charger is disconnected from the alternating current power source and the mobile electronic device is connected to the output terminal means of the charger;

means coupled to said output terminal means for detecting whether a voltage at the output terminal means is below a predetermined value; and means in the mobile electronic device and coupled to said detecting means for indicating a detection result to the user of the mobile electronic device.

2. A charger for use in a hand-carried mobile unit of a radio communication apparatus wherein the mobile unit includes a first rechargeable battery as a power source therefor and is detachable from and connectable to the charger, the charger supplying electricity to the first rechargeable battery when the charger is connected to the mobile unit, the charger comprising:

converting means for converting alternating current power to direct current power;

a second rechargeable battery connected to said converting means and charged by direct current supplied from said converting means;

first connecting means for detachably connecting the converting means to a commercial AC power source;

second connecting means for detachably connecting said second rechargeable battery to said first rechargeable battery of the mobile unit, wherein:

in a first state in which said converting means is connected to the commercial AC power source through said first connecting means and said second rechargeable battery is not connected to said first rechargeable battery, said second rechargeable battery is charged by direct current supplied from said converting means, in a second state in which said converting means is connected to the commercial AC power source through said first connecting means and said second rechargeable battery is connected to said first rechargeable battery through said second connecting means, said first rechargeable battery as well as said second rechargeable battery are charged by direct current supplied from said converting means, and in a third state in which said converting means is not connected to the commercial AC power source and said second rechargeable battery is connected to said first rechargeable battery through said second connecting means, said first rechargeable battery is charged said second rechargeable battery;

means connected to said second rechargeable battery, for detecting a voltage of said second rechargeable battery; and means for transmitting an output of said detecting means to the mobile unit when the mobile unit is connected to the charger, wherein a charged state of said second rechargeable battery is indicated at the mobile unit based upon the output of said detecting means which is transmitted by said transmitting means.

3. A radio communication apparatus comprising:

a hand-carried mobile unit operable by a first rechargeable battery and including means for preventing reverse flow of a charging current for said first rechargeable battery; and a charger detachable from and connectable to said mobile unit, for supplying electricity to said first rechargeable battery when said charger is connected to said mobile unit, of the charger, wherein said charger comprises:

converting means for converting alternating current power to direct current power;

a second rechargeable battery connected to said converting means and charged by direct current supplied from said converting means;

first connecting means for detachably connecting the converting means to a commercial AC power source;

second connecting means for detachably connecting said second rechargeable battery to said first rechargeable battery of said mobile unit;

means connected to said second rechargeable battery, for detecting a voltage of said second rechargeable battery; and means for transmitting an output of said detecting means to said mobile unit when said mobile unit is connected to said charger, and wherein said mobile unit further comprises:

means for indicating a charged state of said second rechargeable battery based upon the output of said detecting means which is transmitted by said transmitting means, wherein:

in a first state in which said converting means is connected to the commercial AC power source through said means and said second rechargeable battery is not connected to said first rechargeable battery, said second rechargeable battery is charged by direct current supplied from said converting means, in a second state in which said converting means is connected to the commercial AC power source through said first connecting means and said second rechargeable battery is connected to said first rechargeable battery through said second connecting means, said first rechargeable battery is charged direct current supplied from said converting means via said reverse flow preventing means while said second rechargeable battery is charged direct current supplied from said converting means, and in a third state in which said converting means is not connected to the commercial AC power source and said second rechargeable battery is connected to said first rechargeable battery through said second connecting means, said first rechargeable battery is charge by said second rechargeable battery via said reverse flow preventing means, whereby said first rechargeable battery of said mobile unit can be charged even when said charger is not connected to the commercial AC power source.

4. A radio communication apparatus comprising:

a hand-carried mobile unit operable by a first rechargeable battery and including means for preventing reverse flow of a charging current for said first rechargeable battery; and a charger detachable from and connectable to said mobile unit, for supplying electricity to said first rechargeable battery when said charger is connected to said mobile unit, of the charger, wherein said charger comprises:

converting means for converting alternating current power to direct current power;

a second rechargeable battery connected to said converting means and charged by direct current supplied from said converting means;

first connecting means for detachably connecting the converting means to a commercial AC power source;

second connecting means for detachably connecting said second rechargeable battery to said first rechargeable battery of said mobile unit;

first detecting means connected to said second rechargeable battery, for detecting a voltage of said second rechargeable battery; and means for transmitting an output of said first detecting means to said mobile unit when said mobile unit is connected to said charger, and wherein said mobile unit further comprises:

second detecting means connected to said first rechargeable battery, for detecting a voltage of said first rechargeable battery;

third detecting means for detecting whether said charger is connected to said mobile unit; and means for indicating a charged state of said first rechargeable battery based upon the output of said second detecting means when said third detecting means detects that said charger is not connected to said mobile unit, and indicating a charged state of said second rechargeable battery based upon the output of said first detecting means which is transmitted by said transmitting means when said charger is connected to said mobile unit, wherein:

in a first state in which said converting means is connected to the commercial AC power source through said first connecting means and said second rechargeable battery is not connected to said first rechargeable battery, said second rechargeable battery is charged by direct current supplied from said converting means, in a second state in which said converting means is connected to the commercial AC power source through said first connecting means and said second rechargeable battery is connected to said first rechargeable battery through said second connecting mean, said first rechargeable battery is charged direct current supplied from said converting means via said reverse flow preventing means while said second rechargeable battery is charged by direct current supplied from said converting means, and in a third state in which said converting means is not connected to the commercial AC power source and said second rechargeable battery is connected to said first rechargeable battery through said second connecting means, said first rechargeable battery is charged by said second rechargeable battery via said reverse flow preventing means, whereby said first rechargeable battery of said mobile unit can be charged even when said charger is not connected to the commercial AC power source.

* * * * *

UNITED STATES PATENT AND TRADEMARK OFFICE
CERTIFICATE OF CORRECTION

PATENT NO. : 5,343,136
DATED : August 30, 1994
INVENTOR(S) : Shuji YAMAGUCHI et al It is certified that error appears in the above-indentified patent and that said Letters Patent is hereby corrected as shown below:

Claim 2, Column 7, Line 49, after "charged" insert --by--.

Claim 3, Column 8, Line 27, before "means" insert --first connecting--.

Claim 3, Column 8, Line 41, before "direct" insert --by--.

Claim 3, Column 8, Line 48 change "charge" to --charged--.

Claim 4, Column 10, Line 13 change "mean" to --means--.

Signed and Sealed this

Twenty-second Day of August, 1995

BRUCE LEHMAN

Attest:

Attesting Officer

Commissioner of Patents and Trademarks